US011982961B2

(12) United States Patent
Kawai et al.

(10) Patent No.: US 11,982,961 B2
(45) Date of Patent: May 14, 2024

(54) FIXING DEVICE

(71) Applicant: CANON KABUSHIKI KAISHA, Tokyo (JP)

(72) Inventors: Hiroki Kawai, Chiba (JP); Yasuharu Toratani, Chiba (JP); Hiroshi Miyamoto, Saitama (JP); Akiyoshi Shinagawa, Saitama (JP); Ayano Ogata, Ibaraki (JP); Daigo Matsuura, Tokyo (JP); Misa Kawashima, Chiba (JP); Masanobu Tanaka, Chiba (JP); Asuna Fukamachi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,651

(22) Filed: Feb. 9, 2023

(65) Prior Publication Data

US 2023/0273555 A1 Aug. 31, 2023

(30) Foreign Application Priority Data

Feb. 28, 2022 (JP) ................................ 2022-028930

(51) Int. Cl.
*G03G 15/20* (2006.01)

(52) U.S. Cl.
CPC ..... *G03G 15/2053* (2013.01); *G03G 15/2025* (2013.01)

(58) Field of Classification Search
CPC . G03G 15/20; G03G 15/2025; G03G 15/2053
USPC ................................ 399/122, 320, 328, 329
See application file for complete search history.

(56) References Cited

U.S. PATENT DOCUMENTS

| | | | |
|---|---|---|---|
| 10,901,353 | B2 | 1/2021 | Tanaka et al. |
| 11,156,948 | B2 | 10/2021 | Tanaka et al. |
| 11,194,275 | B2 | 12/2021 | Takemasa et al. |
| 11,300,906 | B2 | 4/2022 | Takemasa et al. |

FOREIGN PATENT DOCUMENTS

| | | | |
|---|---|---|---|
| CN | 104932234 | * | 9/2015 |
| CN | 106569399 | * | 1/2020 |
| JP | 2015072302 | * | 4/2015 |
| JP | 2020-52354 A | | 4/2020 |

OTHER PUBLICATIONS

U.S. Appl. No. 18/161,164, filed Jan. 30, 2023, Matsuura et al.
U.S. Appl. No. 18/170,082, filed Feb. 16, 2023, Shinagawa et al.

* cited by examiner

*Primary Examiner* — Hoan H Tran
(74) *Attorney, Agent, or Firm* — Venable LLP

(57) ABSTRACT

A fixing device includes an endless belt, a rotatable pressing member, a pad member inside of the belt, and a sliding member held by the pad member and sliding on an inner circumferential surface of the belt in a nip. The rotatable pressing member nips and feeds a recording material in the nip in cooperation with the belt and fixes a toner image on the recording material by applying heat and pressure. The sliding member includes a base material layer on which a plurality of projections projecting toward the rotatable pressing member are formed on a side sliding with the belt and a sliding layer provided on an outer surface of the plurality of projections. A shape of a surface of the sliding layer is a curved surface and a radius of curvature R of the curved surface satisfies 300 μm≤R≤850 μm.

10 Claims, 11 Drawing Sheets

| SAMPLE | RADIUS OF CURVATURE R | WEAR OF SLIDING LAYER | DAMAGE OF BELT | INITIAL DRIVE TORQUE (LESS THAN 1h) | FINAL DRIVE TORQUE (240h) |
|---|---|---|---|---|---|
| SLIDING MEMBER A | 162 μm | EXPOSURE OF BASE MATERIAL | ENORMOUS | ○ | × |
| SLIDING MEMBER B | 306 μm | SMALL RESIDUAL SLIDING LAYER | STRIPPED SCAR | ○ | ○ |
| SLIDING MEMBER C | 505 μm | RESIDUAL SLIDING LAYER | SLIGHT | ○ | ○ |
| SLIDING MEMBER D | 681 μm | RESIDUAL SLIDING LAYER | SLIGHT | ○ | ○ |
| SLIDING MEMBER E | 821 μm | ALMOST NO WEAR | STRIPPED SCAR | △ | — |
| SLIDING MEMBER F | 985 μm | — | — | × | — |
| SLIDING MEMBER G | 1101 μm | — | — | × | — |

DRIVE TORQUE
○:MAINTAIN PREDETERMINED VALUE OF TORQUE OR LESS
△:STOP DUE TO NEAR UPPER LIMIT OF PREDETERMINED VALUE
×:STOP DUE TO EXCESS OF PREDETERMINED VALUE

Fig. 8

FIXING DEVICE

FIELD OF THE INVENTION AND RELATED ART

The present invention relates to a fixing device which fixes a toner image which is borne on a recording material to the recording material.

As a fixing device, a configuration in which a nip portion which nips and feed a recording material by a nip forming member such as a belt and a roller is formed and the recording material which passes through the nip portion is heated and pressed has been known. Further, in the configuration, the nip portion is formed between the belt and the nip forming member by sliding a sliding member on an inner peripheral surface of the belt in the nip portion.

In order to ensure quality of an image which is fixed on the recording material, it is required for the fixing device to suppress slip between the recording material which is fed in the nip portion and the belt, and slip between the recording material and the nip portion forming member. Therefore, a frictional force between the belt and the sliding member is required to be smaller than a frictional force between the recording material and the belt and a frictional force between the recording material and the nip portion forming member. In particular, in a configuration which includes a wide nip in which the nip portion is made to be wider to increase heating efficiency, it is required that the frictional force between the belt and the sliding member is reduced.

For example, in Japanese Laid-Open Patent Application (JP-A) 2020-52354, a configuration, in which concaves and convexes are formed on a sliding sheet which slides with an inner peripheral surface of the belt in the nip portion in order to reduce a frictional force between the sliding sheet and the belt, is disclosed.

Here, in a configuration in which the concaves and the convexes are formed on the sliding member to reduce the frictional force between the sliding member and the inner peripheral surface of the belt, there is a case that a sliding layer is provided on a surface of a base material layer to reduce a coefficient of friction. In this case, when a contact area between the sliding layer and the belt is large, a driving torque of the belt may exceed an allowable value from an initial state. On the other hand, when the contact area is small, a beak pressure which applies to a contact portion of the sliding layer with the belt may increase and wear of the sliding layer may be promoted. And when the base material layer is exposed due to wear of the sliding layer, the inner peripheral surface of the belt is easily damaged and a lifetime of the belt may be shortened. Further, when abrasive powder of the belt may stay in the sliding portion, an image defect may easily occur and the driving torque of the belt may increase.

A purpose of the present invention is to provide a configuration in which the contact area between the sliding layer and the belt can be appropriately sized.

SUMMARY OF THE INVENTION

According to an aspect of the present invention, there is provided a fixing device comprising, an endless belt configured to apply heat to a recording material, a rotatable pressing member contacting an outer circumferential surface of the belt, a pad member inside of the belt, configured to form a nip portion by nipping and feeding the belt between itself and the rotatable pressing member, and a sliding member held by the pad member and configured to slide on an inner circumferential surface of the belt in the nip portion, wherein the rotatable pressing member nips and feeds the recording material in the nip portion in cooperation with the belt and fixes a toner image on the recording material by applying heat and pressure, wherein the sliding member includes a base material layer on which a plurality of projections projecting toward the rotatable pressing member are formed on a side sliding with the belt and a sliding layer provided on an outer surface of the plurality of projections, and wherein a shape of a surface of the sliding layer is a curved surface and a radius of curvature R of the curved surface satisfies $300\ \mu m \le R \le 850\ \mu m$.

Further features of the present invention will become apparent from the following description of exemplary embodiments with reference to the attached drawings.

Figure 1:
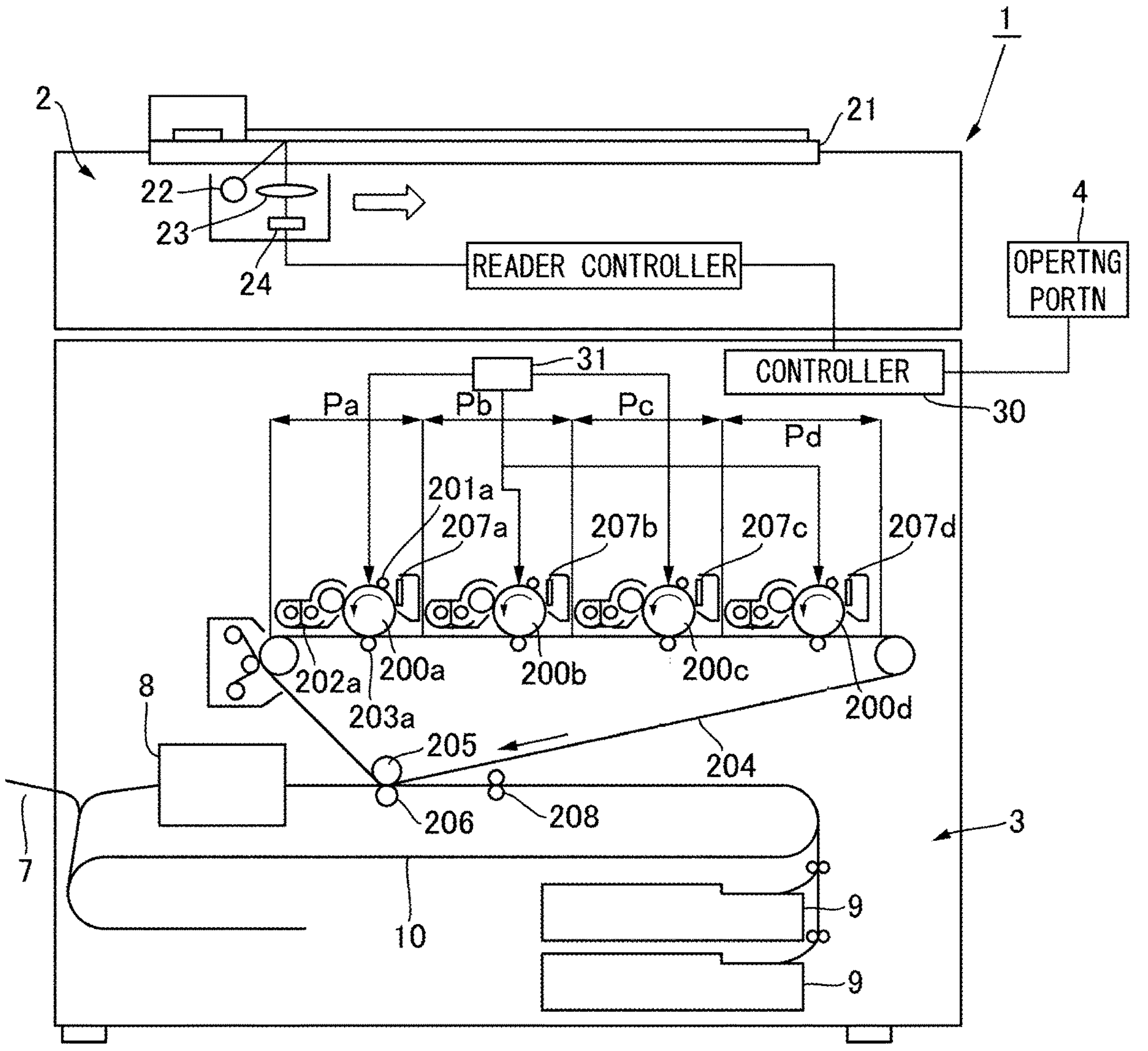
FIG. 1 is a schematic configuration sectional view of an image forming apparatus according to an embodiment.
Figure 2:
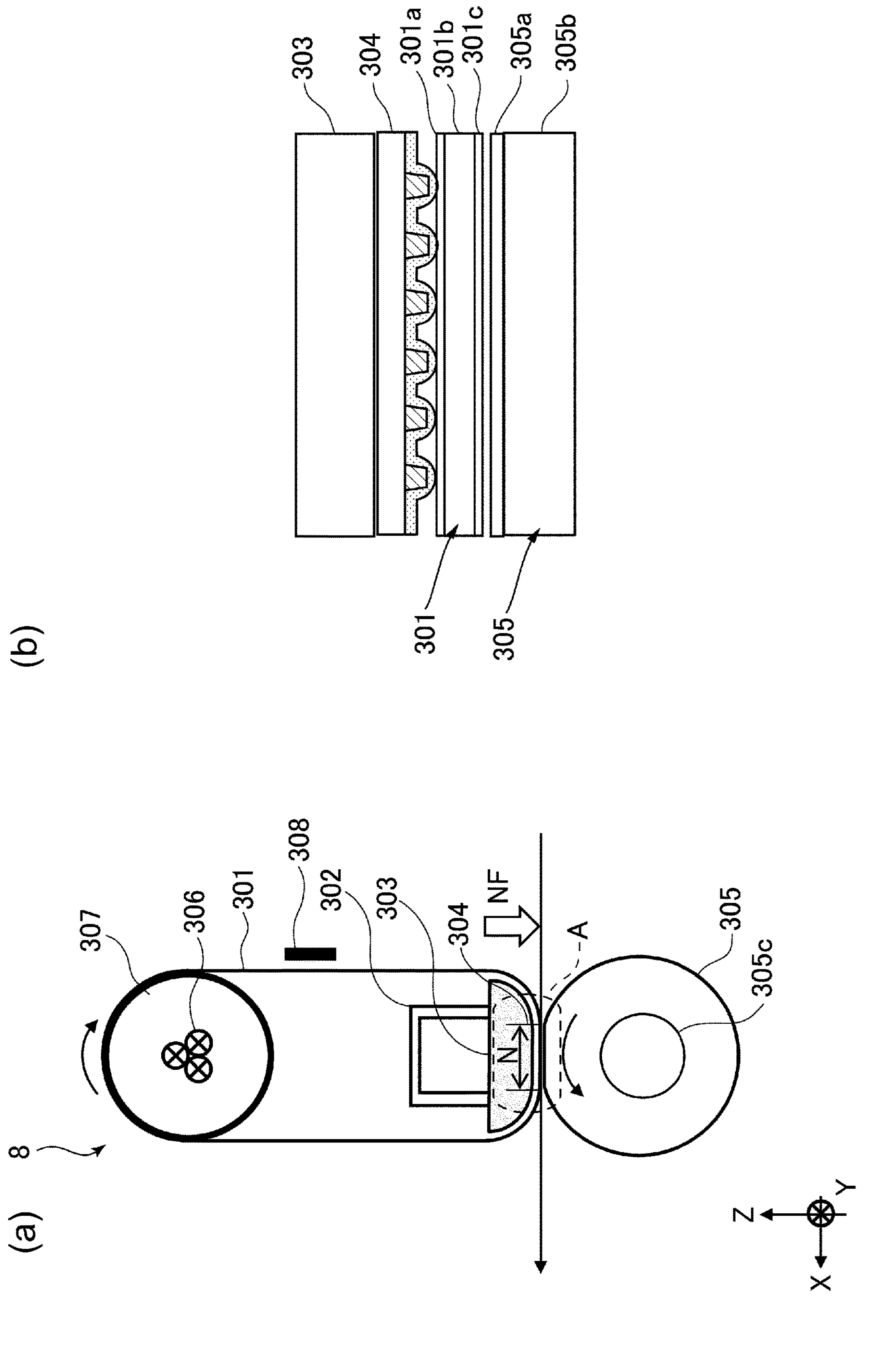

Part (a) of FIG. 2 is a schematic configuration sectional view of a fixing device according to the embodiment, and part (b) of FIG. 2 is a schematic view showing an enlarged area A of part (a) of FIG. 2.

Figure 3:
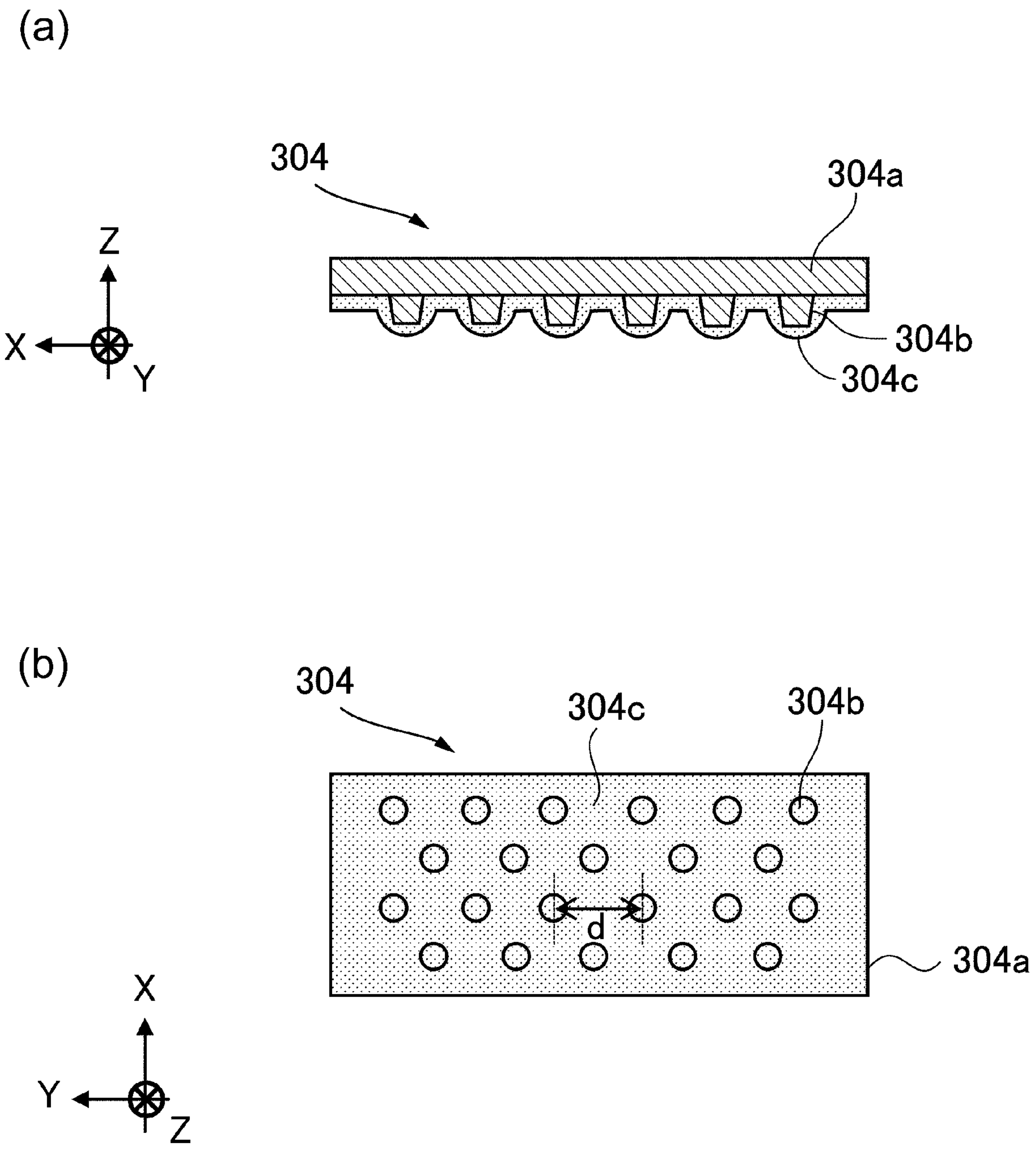

Part (a) of FIG. 3 is a schematic view and part (b) of FIG. 2 is a plan view which are schematically showing a sliding member according to the embodiment.

Figure 4:
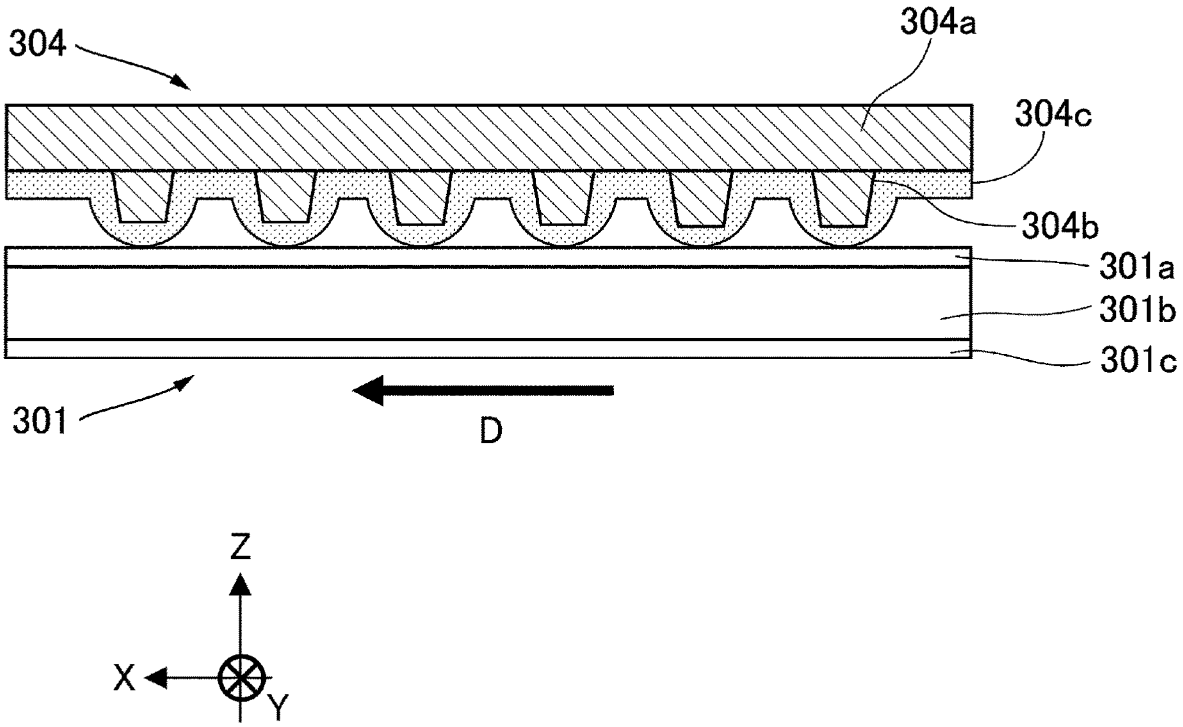

FIG. 4 is a sectional view schematically showing a relationship between the sliding member and a belt according to the embodiment.

Figure 5:
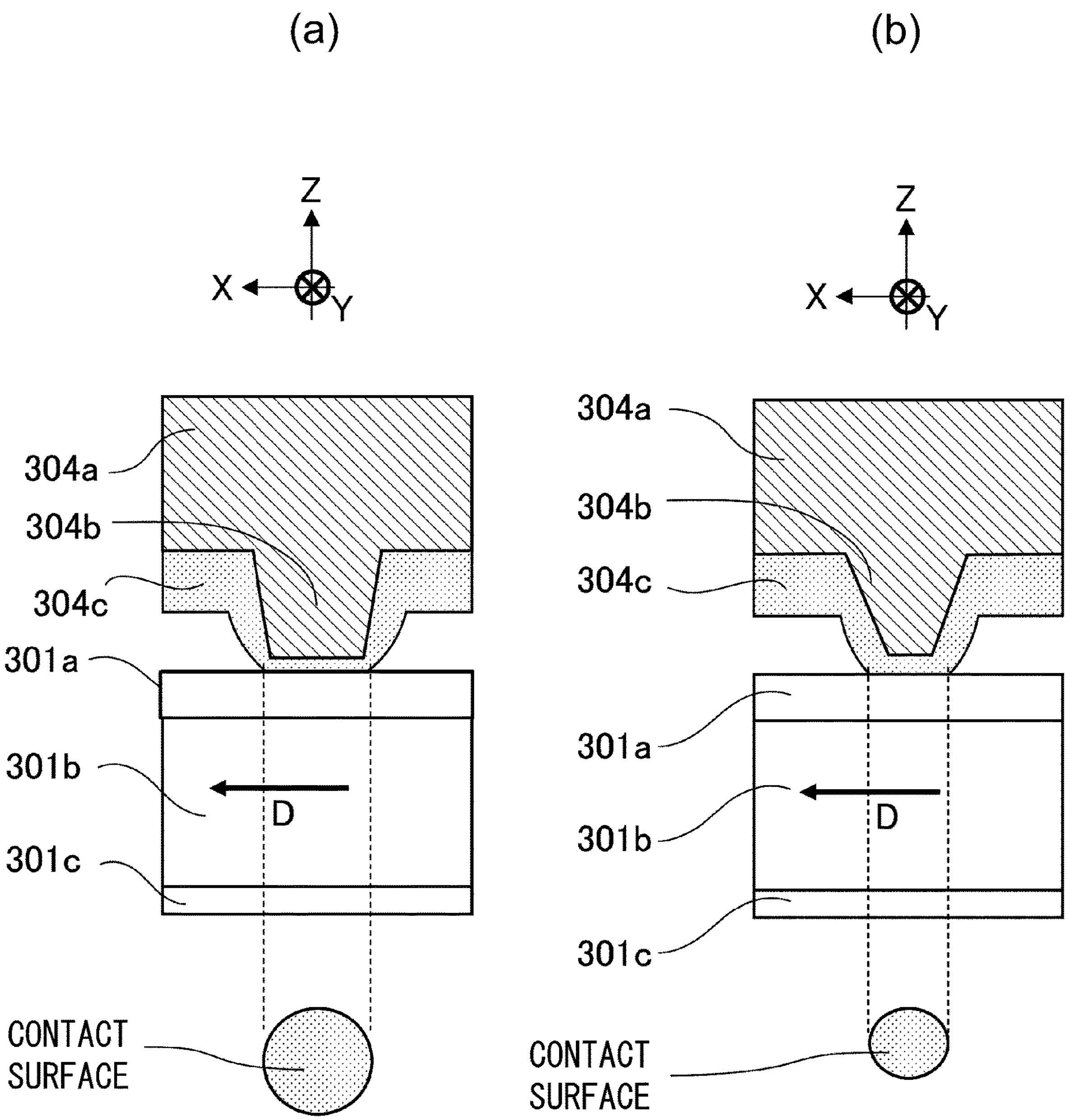

Part (a) and part (b) of FIG. 5 are sectional views which schematically show the relationship between a protrusion of the sliding member and the belt, part (a) of FIG. 5 is showing a state in which a contact area between a sliding layer of the protrusion and the belt is large, and part (b) of FIG. 5 is showing a state in which the contact area between the sliding layer of the protrusion and the belt is small.

Figure 6:
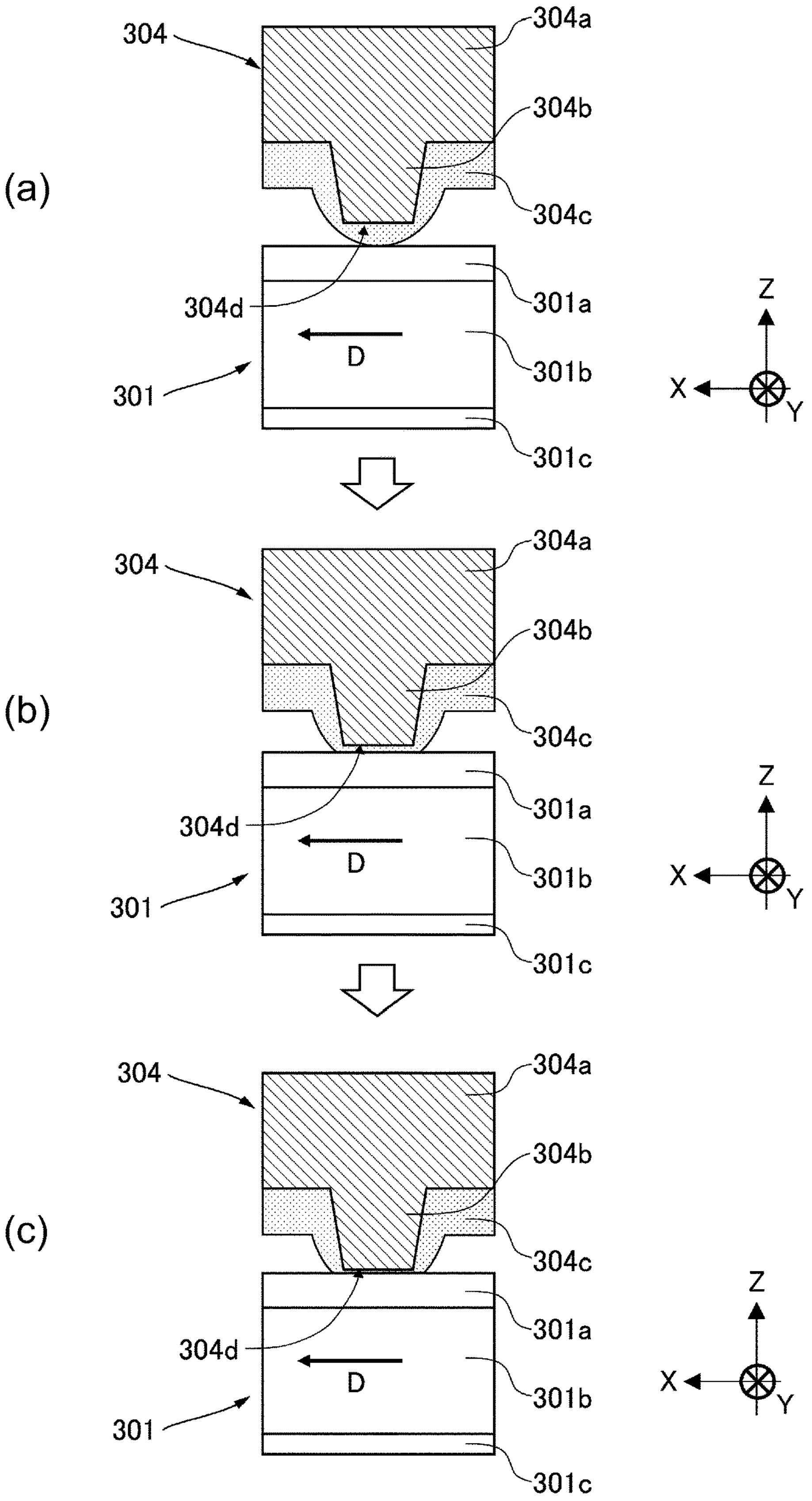

Part (a), part (b) and part (c) of FIG. 6 are sectional views which schematically show the relationship between the protrusion of the sliding member and the belt, part (a) of FIG. 6 is showing a state in which a film thickness of the sliding layer of the protrusion is thick, part (b) of FIG. 6 is showing a state in which the film thickness is decreased, and part (c) of FIG. 6 is showing a state in which a leading end surface of the protrusion is exposed.

Figure 7:
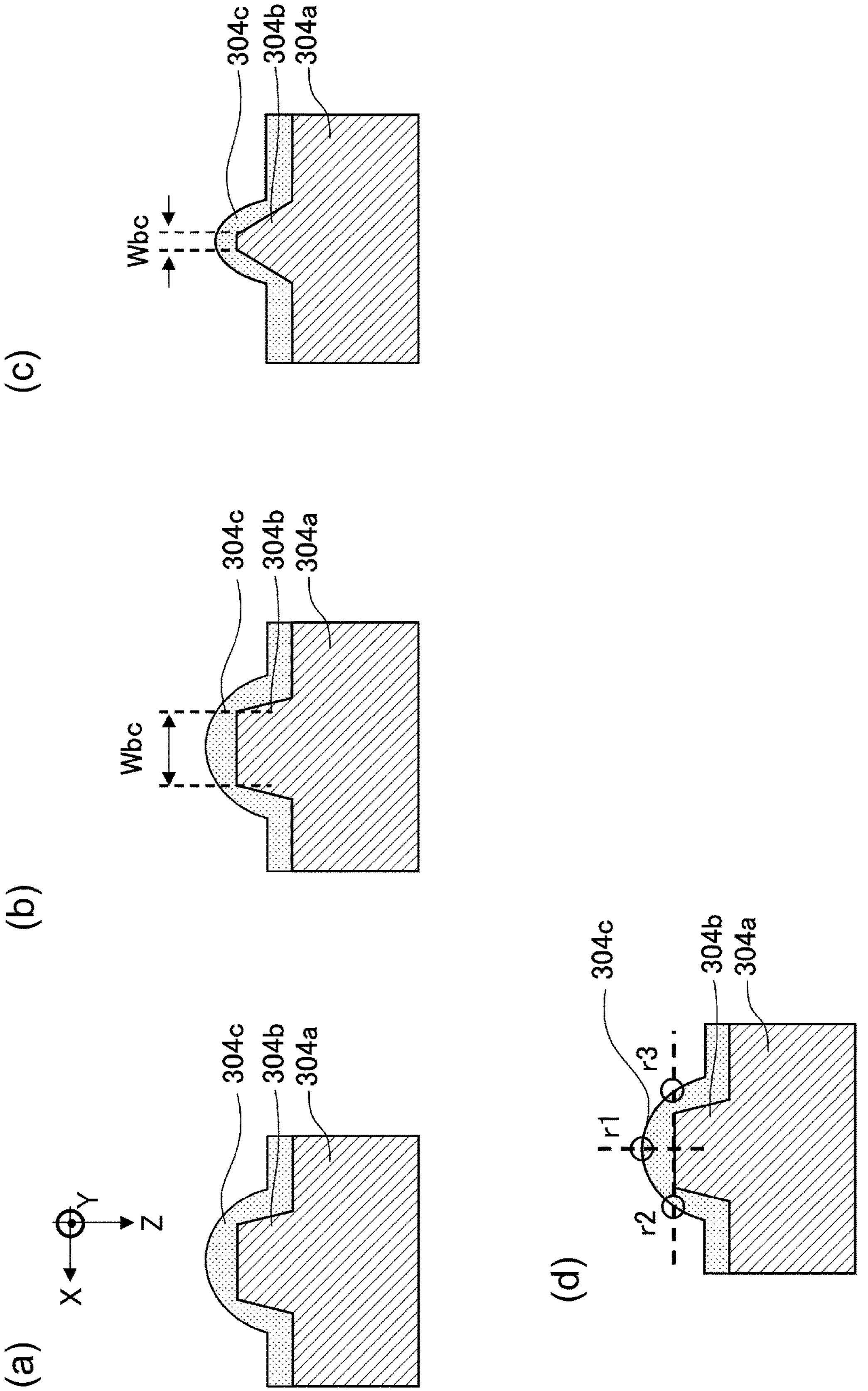

Part (a) of FIG. 7 is a sectional view which schematically shows the protrusion of the sliding member which is enlarged, part (b) of FIG. 7 is a sectional view in a case that a leading end surface of the protrusion is wide, part (c) of FIG. 7 is a sectional view in a case that the leading end surface of the protrusion is narrow, and part (d) of FIG. 7 is a sectional view illustrating calculation of a curvature radius of the sliding layer.

FIG. 8 is a table showing results of experiments which are conducted to assess an effect of the embodiment.

Figure 9:
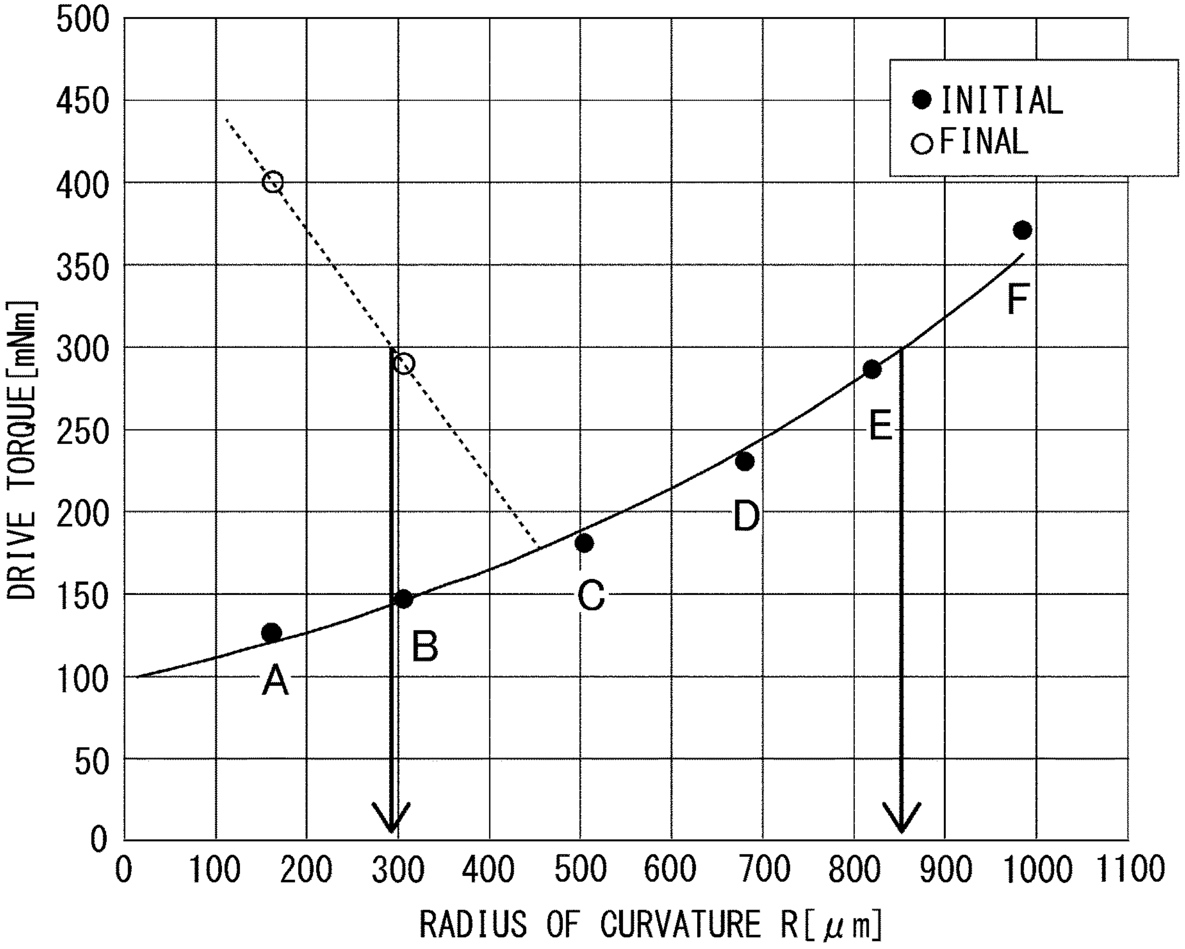

FIG. 9 is a graph showing the results of the experiments which are conducted to assess the effect of the embodiment.

Figure 10:
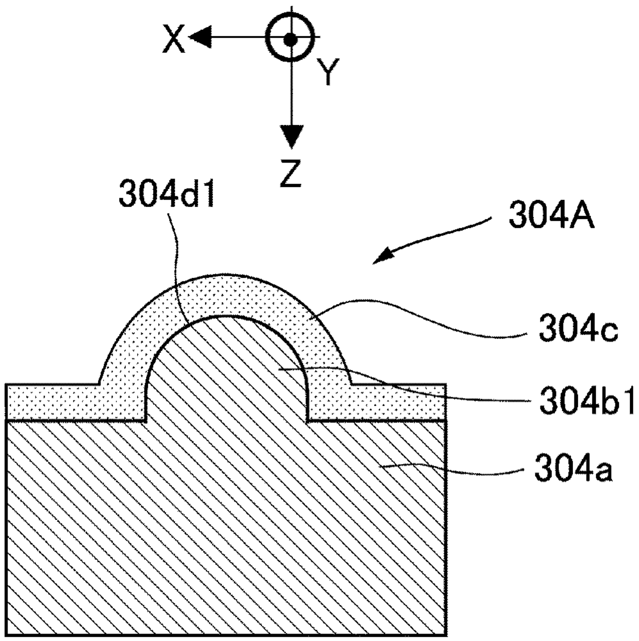

FIG. 10 is a sectional view which schematically shows the protrusion of the sliding member which is enlarged according to another first example of the embodiment.

Figure 11:
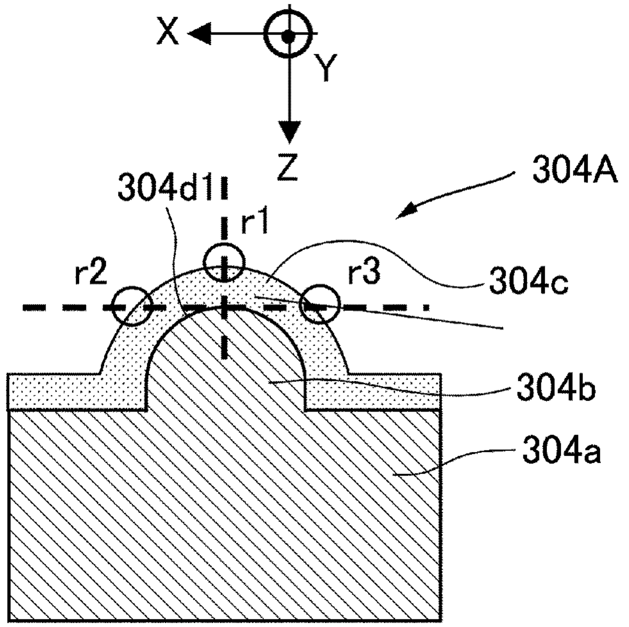

FIG. 11 is a sectional view illustrating the calculation of the curvature radius of the sliding layer according to another first example of the embodiment.

Figure 12:
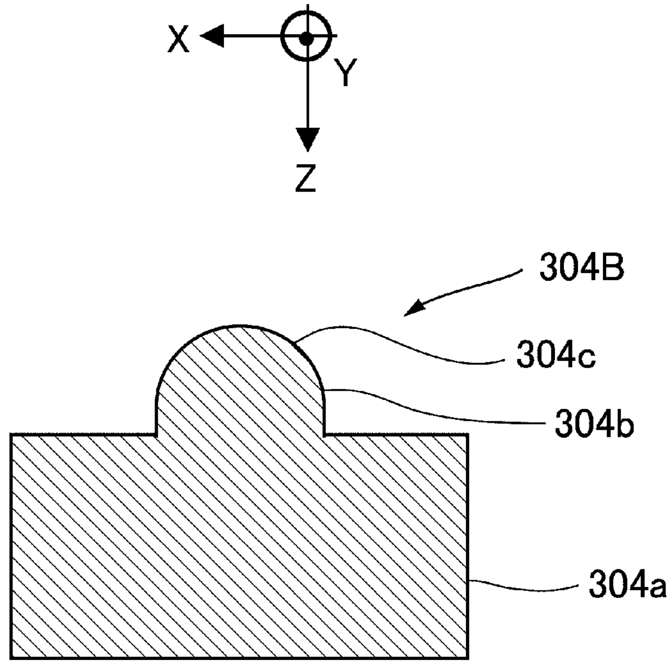

FIG. 12 is a sectional view which schematically shows the protrusion of the sliding member which is enlarged according to another second example of the embodiment.

Figure 13:
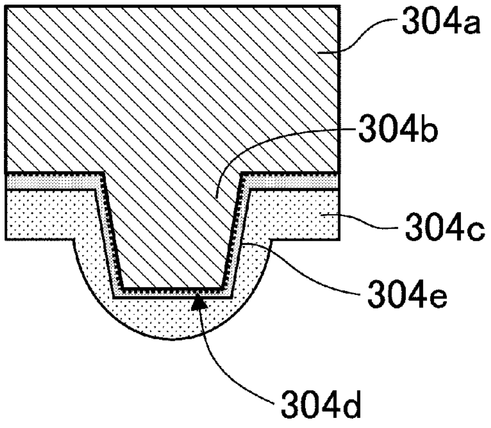

FIG. 13 is a sectional view which schematically shows the protrusion of the sliding member according to another third example of the embodiment.

DESCRIPTION OF THE EMBODIMENTS

The embodiments will be described by using from FIG. 1 through FIG. 9. First of all, a schematic configuration of an image forming apparatus according to the embodiment will be described by using FIG. 1.

[Image Forming Apparatus]

An image forming apparatus 1 is a full color printer of an electrophotographic type which includes four image forming portions Pa, Pb, Pc and Pd, which are provided corresponding to each of four colors which are yellow, magenta, cyan and black. In the embodiment, a tandem type is applied in which the image forming portions Pa, Pb, Pc and Pd are arranged along a rotational direction of an intermediary transfer belt 204 which will be described below. The image forming apparatus 1 forms a toner image (image) on a recording material according to an image signal from an image reading portion (document reading device) 2 which is connected to an image forming apparatus main assembly 3 or a host device such as a personal computer which is communicably connected to the image forming apparatus main assembly 3. The recording material includes sheet material such as paper, plastic film and cloth.

The image forming apparatus 1 is provided with the image reading portion 2 and the image forming apparatus main assembly 3. In the image reading portion 2 which reads a document which is placed on a document table glass 21, light which is emitted from a light source 22 is reflected by the document and forms an image on a CCD sensor 24 through an optical system member 23 such as a lens. By scanning in a direction of an arrow, such an optical system unit converts the document into an electrical signal data column for each line. An image signal which is obtained by the CCD sensor 24 is sent to the image forming apparatus main assembly 3, and image processing is performed according to each image forming portion, which will be described below, in a control portion 30. Further, the control portion 30 receives external input from an external host device, such as a print server, as an image signal.

The image forming apparatus main assembly 3 is provided with the plurality of image forming portions Pa, Pb, Pc and Pd, and each of the image forming portions performs image forming based on the image signal which is described above. That is, the image signal is converted into a laser beam which is PWM (Pulse Width Modulation) controlled by the control portion 30. A polygon scanner 31 as an exposure device scans the laser beam according to the image signal. And the laser beam is emitted to photosensitive drums from 200*a* through 200*d* as image bearing members in each of the image forming portions from Pa through Pd.

Incidentally, Pa is the image forming portion for yellow color (Y), Pb is the image forming portion for magenta color (M), Pc is the image forming portion for cyan color (C) and Pd is the image forming portion for black (Bk), which form images of the corresponding colors. Since the image forming portions from Pa through Pd are substantially same, details of the image forming portion Pa of Y will be described below, and descriptions of the other image forming portions will be omitted. In the image forming portion Pa, the photosensitive drum 200*a* forms a toner image on a surface of the photosensitive drum 200*a* based on the image signal as will be described below.

A charging roller 201*a* as a primary charging device charges a surface of the photosensitive drum 200*a* to a predetermined potential and makes preparations for forming an electrostatic latent image. The laser beam which is emitted from the polygon scanner 31 forms the electrostatic latent image on the surface of the photosensitive drum 200*a* which is charged to the predetermined potential. The developing device 202*a* develops the electrostatic latent image on the photosensitive drum 200*a* and forms a toner image. The primary transfer roller 203*a* applies a primary transfer bias of opposite polarity to the toner by discharging from a back of the intermediary transfer belt 204 and transfers the toner image on the photosensitive drum 200*a* onto the intermediary transfer belt 204. After transferring, the surface of the photosensitive drum 200*a* is cleaned by a cleaner 207*a*.

Further, the toner image on the intermediary transfer belt 204 is conveyed to the next image forming portion, the toner image of each color which formed in the respective image forming portion is sequentially transferred in an order of Y, M, C and Bk, and four color images are formed on the surface of the intermediary transfer belt 204. And the toner image which is passed through the image forming portion Pd, which is Bk and the most downstream of the intermediary transfer belt 204 with respect to a rotational direction, is conveyed to a secondary transfer portion which is configured of a secondary transfer roller pair 205 and 206. And in the secondary transfer portion, when a secondary transfer electric field of opposite polarity to the toner image on the intermediary transfer belt 204 is applied, the toner image is secondary transferred to the recording material.

The recording material is accommodated in a cassette 9, the recording material which is fed from the cassette 9 is conveyed to a registration portion 208 which is configured of a pair of registration rollers, for example, and waits at the registration portion 208. After that, the registration portion 208 conveys the recording material to the secondary transfer portion when a timing is controlled in order to align the paper with the toner image on the intermediary transfer belt 204.

The recording material in which the toner image is transferred in the secondary transfer portion is conveyed to the fixing device 8, and the toner image which is borne on the recording material is fixed to the recording material when the recording material is heated and pressed in the fixing device 8. The recording material, which is passed through the fixing device 8, is discharged to a discharging tray 7. Incidentally, in a case that image forming is performed on both sides of the recording material, when transferring and fixing of the toner image on a first side (front side) of the recording material is completed, the front and the back of the recording material are reversed through a reverse conveying portion 10, the toner image is transferred and fixed on a second side (back side) of the recording material, and the recording material is stacked on the discharging tray 7.

Incidentally, the control portion 30 controls the whole of the image forming apparatus 1 as described above. Further, the control portion 30 is possible to make various settings, etc., based on an input from the operating portion 4 in which the image forming apparatus 1 includes. The control portion 30 includes a CPU (Central Processing Unit), ROM (Read Only Memory) and RAM (Random Access Memory). The CPU controls each portion while reading a program which corresponds to a control procedure which is stored in the ROM. Further, the RAM stores working data and input data, and the CPU performs control by referring to the data which are stored in the RAM based on the program which is described above, etc.

[Fixing Device]

Next, a configuration of the fixing device 8 in the embodiment will be described by using part (a) and part (b) of FIG. 2. In the embodiment, the fixing device with a belt heating method, to which an endless belt is applied, is used. In part (a) of FIG. 2, an X direction indicates a conveying direction of the recording material P (not shown in the figure), a Y direction indicates a widthwise direction of the recording material which intersects (perpendicular in the embodiment) the conveying direction of the recording material, and a Z direction indicates a pressing direction which is a direction in which the recording material is pressed at a nip portion N. In the embodiment, the X direction, the Y direction and the Z direction are each perpendicular to each other.

The fixing device 8 includes a fixing belt (hereinafter referred to as "belt") 301, a stay 302, a pressing pad (hereinafter referred to as "pad") 303, a sliding member 304, a pressing roller 305, a heating roller 307, a thermistor 308, etc. The belt 301 is a heating rotatable member which is endless and rotatable. The pressing roller 305 as a nip portion forming member is a pressing rotatable roller which abuts against an outer peripheral surface of the belt 301 and forms a nip portion N which nips and conveys the recording material between the pressing roller 305 and the belt 301.

The sliding member 304 slides against an inner peripheral surface of the belt 301 in the nip portion N. The pad 303 as a backup member is arranged so as to nip the sliding member 304 and the belt 301 between the pad 303 and the pressing roller 305 inside the belt 301 and backs up the sliding member 304. The sliding member 304 is arranged so as to cover an outer peripheral surface of the pad 303 in a side of the belt 301. The stay 302 is arranged on an opposite side of the nip portion N across the pad 303 inside the belt 301, and supports the pad 303. The heating roller 307 is arranged so as to stretch the belt 301 inside the belt 301 and heats the belt 301. The thermistor 308 as a temperature sensing member detects temperature of the belt 301. Each configuration will be described in detail below.

The belt 301 includes thermal conductivity and heat resistance, etc., and is thin and cylindrical. In the embodiment, the belt 301 is configured of a three layer structure which forms a base layer 301*a*, an elastic layer 301*b* on an outer periphery of the base layer 301*a*, and a mold release layer 301*c* on an outer periphery of the elastic layer 301*b*, as shown in part (b) of FIG. 2. The base layer 301*a*, for example, is 80 μm thick and made of polyimide resin (PI). The elastic layer 301*b*, for example, is 300 μm thick and made of silicone rubber. The mold release layer 301*c*, for example, is 30 μm thick and made of PFA (tetrafluoroethylene/perfluoroalkoxyethylene copolymer resin) as a fluorocarbon resin. The belt 301 is stretched by the pad 303 and the heating roller 307. An outer diameter of the belt 301 is 150 mm in the embodiment.

The pad 303 is arranged so as to oppose the pressing roller 305 across the belt 301 inside the belt 301, while the nip portion N which nips and conveys the recording material between the belt 301 and the pressing roller 305 is formed. In the embodiment, the pad 303 is a substantially plate shaped member which is long with respect to a widthwise direction of the belt 301 (longitudinal direction which intersects a rotational direction of the belt 301 and a direction of a rotational axis of the heating roller 307). When the pad 303 is pressed against the pressing roller 305 across the belt 301, the nip portion N is formed. LCP (liquid crystal polymer) resin is used for a material of the pad 303. A sliding member 304 is interposed between the pad 303 and the belt 301. Details of the sliding member 304 will be described below.

The pad 303 is supported by the stay 302 as a support member which is arranged inside the belt 301. That is, the stay 302 is arranged on the opposite side of the pad 303 from the pressing roller 305 and supports the pad 303. The stay 302, which is a reinforcing member which has high rigidity with respect to the longitudinal direction of the belt 301, abuts against the pad 303 and backs up the pad 303. That is, the stay 302 gives strength to the pad 303 and secures a pressing force in the nip portion N, when the pad 303 is pressed from the pressing roller 305.

The stay 302 is made of metal such as stainless steel, and a cross section (transverse section), which is perpendicular to a longitudinal direction of the stay 302 which intersects a rotational direction of the belt 301, is substantially rectangular shape. For example, the stay 302 is made of drawn SUS304 (stainless steel) with a wall thickness of 3 mm and its strength is secured by forming the transverse section into a hollow whose shape is substantially square. Incidentally, the cross section of the stay 302 may be formed in a substantially rectangular shape by combining plurality of sheet metal, securing them to each other by welding, etc. Further, material of the stay 302 is not limited to stainless steel as long as its strength may be secured.

The heating roller 307 is arranged inside the belt 301 and stretches the belt 301 in addition to the pad 303. The heating roller 307 is formed in a cylindrical shape by metal such as aluminum or stainless steel, and a halogen heater 306 as a heating source for heating the belt 301 is arranged inside the heating roller 307. And the heating roller 307 is heated to a predetermined temperature by the halogen heater 306.

The heating roller 307 is also a steering roller which has a rotational center at one end or near a center with respect to the longitudinal direction and controls a position of the belt 301 with respect to a main scanning direction by generating a tension difference back and forth by rotating it against the belt 301. Further, the heating roller 307 is also a tension roller which is urged by a spring which is supported by an unshown frame and applies a predetermined tensile force to the belt 301.

In the embodiment, the heating roller 307 is formed by a pipe which is made of stainless steel and is 1 mm thickness, for example. Further, one halogen heater 306 may be enough, however, it is preferable to include the plurality of halogen heaters 306, considering temperature distribution control in a longitudinal direction (direction of rotational axis) of the heating roller 307. The plurality of halogen heaters 306 have light distributions which differ from each other in the longitudinal direction, and lighting ratio is controlled according to size of the recording material. In the embodiment, three halogen heaters 306 are arranged. Incidentally, the heating source is not limited to halogen heaters, however, it may be other heaters which is possible to heat the heating roller 307, for example, carbon heaters, etc.

The belt 301 is heated by the heating roller 307 which is heated by the halogen heater 306 and is controlled to a predetermined target temperature according to a type of the recording material based on temperature detection by the thermistor 308. The thermistor 308 is arranged opposing the outer peripheral surface of the belt 301 near a center in which all sizes of the recording materials, which are possible to be fixed in the fixing device 8 with respect to the widthwise direction of the belt 301, pass through. And the thermistor 308 detects the temperature of the belt 301, and the control portion 30 controls electric power which is supplied to the halogen heater 306 so that the temperature which is detected by the thermistor 308 becomes the target temperature. Incidentally, the thermistor 308 may be a non-contact sensor which is arranged in close proximity to the outer peripheral surface of the belt 301 or a contact sensor which is arranged in contact with the outer peripheral surface of the belt 301.

The pressing roller 305 is also a driving rotatable member which rotates while abutting against the outer peripheral surface of the belt 301 and imparts driving force to the belt 301. Incidentally, in the embodiment, the heating roller 307 is also rotatably driven by a driving source (for example, a driving motor) and imparts driving force to the belt 301. However, imparting driving force to the heating roller 307 may be omitted. The pressing roller 305 is a roller which forms a core metal (shaft) 305*c*, an elastic layer 305*b* on an outer periphery of the core metal 305*c*, and a mold release layer 305*a* on its outer periphery of the elastic layer 305*b*. The core metal 305*c* is made of stainless steel with a diameter of 72 mm, for example. The elastic layer 305*b* is made of conductive silicone rubber with thickness of 8 mm, for example. The mold release layer 305*a*, for example, is 100 μm thick and made of PFA (tetrafluoroethylene/perfluoroalkoxyethylene copolymer resin) as a fluorocarbon resin. The pressing roller 305 is rotatably supported by a frame (not shown) of the fixing device 8, a gear is fixed at one end of the pressing roller 305, and the pressing roller 305 is connected to a driving source (for example, driving motor, not shown) via the gear and is rotationally driven.

The fixing device 8 heats the toner image in the nip portion N which is formed between the belt 301 and the pressing roller 305, while the fixing device 8 nips and conveys the recording material P which bears the toner image. In this way, the fixing device 8 fixes the toner image on the recording material P, while the fixing device 8 nips and conveys the recording material P. Thus, it is necessary to achieve both function of applying heat and pressure and function of conveying the recording material P. By a driving source which is unshown, the pressing roller 305 is pressed against the sliding member 304 via the belt 301. In the embodiment, it is set so that pressing force (NF) in the nip portion N during image forming, that is, a load value which is applied to the pad 303 and the pressing roller 305 is 1600N, width of the nip portion N in the X direction (with respect to the conveying direction of the recording material) is 24.5 mm and width in the Y direction (with respect to the widthwise direction of the recording material) is 326 mm.

Incidentally, length (nip width) of the nip portion N with respect to the conveying direction (X direction) is formed when the sliding member 304 is pressed against the pressing roller 305 via the belt 301. When the pressing force (NF) in the nip portion N is below 900N, a non-contact region is started to form between the sliding member 304 and the belt 301, so it is not possible to maintain the necessary nip width. Therefore, in the embodiment, the pressing force (NF), that is, the load value which is applied to the pad 303 and the pressing roller 305 is set to be 900N or higher.

[Sliding Member]

A detailed configuration of the sliding member 304 is shown in part (a) and part (b) of FIG. 3. Part (a) of FIG. 3 is a sectional view of the sliding member 304 when it is cut in the conveying direction, and part (b) of FIG. 3 is a plan view of the sliding member 304 when it is viewed from a contacting surface side of the belt 301 with the sliding member 304. The sliding member 304 is fixed to the stay 302 by screws, etc. via the pad 303. Incidentally, the sliding member 304 may be integrated with the pad 303. Further, the sliding member 304 may be partially fixed to the stay 302 or the pad 303. For example, both ends of the sliding member 304 in the Y direction (widthwise direction) may be fixed to the pad 303 with screws, etc.

The sliding member 304 is configured of a base material layer 304*a* and a sliding layer 304*c*. On a side of the base material layer 304*a* which slides on the belt 301, a plurality of protrusions (embossed portions) 304*b* are formed which protrude toward the inner peripheral surface of the belt 301. The sliding layer 304*c* is provided so as to cover a surface of the side of the base material layer 304*a* (including the plurality of protrusions 304*b*) which slides on the belt 301.

The base layer 304*a* may have sufficient strength and heat resistance. Material of the base material layer 304*a* includes stainless steel, copper, aluminum, engineering plastics (PI (polyimide), PEEK (polyether ether ketone), LCP (liquid crystal polymer), etc.), etc., and it is preferable in the embodiment, metal material such as stainless steel, copper and aluminum is preferable in the embodiment. In the embodiment, stainless steel whose thickness is 1.3 mm is used as the base material layer 304*a*.

The plurality of protrusions 304*b* are formed integrally of same material as the base material layer 304*a*, and each of the protrusions 304*b* is arranged in plurality with respect to the conveying direction (X direction) of the recording material and with respect to the widthwise direction (Y direction) of the recording material which intersects the conveying direction in the nip portion N. The plurality of protrusions 304*b* are provided so that total area of leading end surfaces of all of the plurality of protrusions 304*b* is 90% or more of total area of surface on a side of the sliding member 304 which slides on the inner peripheral surface of the belt 301.

Each of a distance (interval) d between centers of adjacent protrusions 304*b* with respect to the conveying direction and a distance (interval) d between centers of adjacent protrusions 304*b* with respect to the widthwise direction is 1.25 mm or more, preferably 1.4 mm or more. In the embodiment, the intervals of the plurality of protrusions 304*b* are same with respect to the conveying direction and with respect to the widthwise direction, in order to ensure uniform sliding properties with the belt 301, and the respective interval d is 1.4 mm. However, in a case that pressure distributions are different between the widthwise direction and the conveying direction, the intervals of the protrusions in each direction may be changed according to the pressure distributions.

By providing the plurality of protrusions 304*b* on the side of the sliding member 304 which slides on the belt 301, contact area between the sliding member 304 and the belt 301 is reduced and, thereby, sliding resistance between the sliding member 304 and the belt 301 is reduced. Incidentally, the plurality of protrusions 304*b* protrude in a cylindrical shape, and the leading end surface (top surface) 304*d* is flat surface (flat).

It is preferable that the sliding layer 304*c* is coating agent such as fluorocarbon resin (PTFE (Poly Tetra Fluoro Ethylene), PFA, etc.) for achieving low friction. In the embodiment, the sliding member 304 is formed by coating PTFE of 20 μm thickness on a surface of the base material layer 304*a* which includes the plurality of protrusions 304*b*. Further, in the embodiment, lubricant is applied to an inner surface of the belt 301. As a result, the belt 301 is configured to slide smoothly on the sliding member 304. Silicone oil is used as lubricant.

Incidentally, with respect to viscosity of lubricant, when the viscosity is too low, it may leak out of an end portion of the belt 301 which is an open end as it circulates around the inner peripheral surface of the belt 301 and be exhausted, then it will not perform the function sufficiently. Further, when the viscosity is too high, it may become difficult to enter between a surface of the sliding layer 304*c* and the belt 301, and it may lose fluidity and cause uneven distribution of the lubricant between an area in which the lubricant is abundant and an area in which the lubricant is insufficient, and after all, it will not perform the function sufficiently. Therefore, it is desirable to use the lubricant in a range of equal to or more than 300 cSt and equal to or less than 15,000 cSt at room temperature (25° C.) as an appropriate viscosity for the lubricant which circulates well and performs the necessary function. In the embodiment, silicone oil whose viscosity is 3,000 cSt is used as the lubricant.

Further, the sliding member 304 according to the embodiment is configured so to cover the pad 303 both inside and outside the nip portion N. That is, except for a surface of the pad 303 on an opposite side of the nip portion N, an entire surface of the pad 303 which opposes the belt 301 is covered by the sliding member 304. Incidentally, the sliding member 304 may be arranged only in the nip portion N of the surface of the pad 303. Further, the plurality of protrusions 304*b* are arranged throughout the sliding member 304, however, in a case that the sliding member 304 is larger than the nip portion N, the plurality of protrusions 304*b* may be configured to be arranged only in the nip portion N.

[Relationship Between the Base Material Layer and the Sliding Layer of the Sliding Member]

As described above, the sliding member 304 is covered with the sliding layer 304*c* on the surface of a side of the base material layer 304*a* in which the plurality of protrusions 304*b* are formed. Here, details of the sliding layer 304*c* of the sliding member 304 when the fixing device 8 is driven will be described. As shown in FIG. 4, when the fixing device 8 is driven, the belt 301 moves relative to the sliding member 304 in a direction D in the figure, and thereby the sliding layer 304*c* slides on the base layer 301*a* of the belt 301.

Part (a) and part (b) of FIG. 5 are schematic diagrams representing cases in which area of contact between the sliding layer 304*c* and the base layer 301*a* is large and small, when the base layer 301*a* of the belt 301 slides on the sliding layer 304*c* which is formed at a leading end portion of the protrusion 304*b*. As shown in part (a) of FIG. 5, in the case that the contact area is large, the lubricant does not enter into the contact portion between the sliding layer and the belt and a formation of a lubricant layer is prevented, and thereby a driving torque of the belt 301 may exceed an allowable value from an initial state. In such a case, an image defect may occur due to a slip of the belt 301 in the nip portion N or may damage to a gear due to overloading of a driving gear which is responsible for a rotational drive. Therefore, it is required by reducing the contact area between the sliding layer 304*c* and the base layer 301*a* of the belt 301, formation of the lubricant layer in the contact portion is promoted and an initial driving torque is minimized.

On the other hand, as shown in part (b) of FIG. 5, when the contact area is too small, a peak pressure which is applied to the contact portion of the sliding layer 304*c* may increase and wear of the sliding layer 304*c* may be promoted. Part (a), part (b) and part (c) of FIG. 6 show changes over time of the sliding layer 304*c* when an image forming operation is continued for a long time while the base layer 301*a* of the belt 301 slides on the sliding layer 304*c*, in a case that the contact area between the sliding layer 304*c* and the belt 301 is reduced.

The sliding layer 304*c* of one protrusion 304*b* is used from a state that film thickness is large as shown in part (a) of FIG. 6, however, as the image forming operation of the image forming apparatus progresses, the sliding layer c gradually wears, and the film thickness of the sliding layer 304*c* at the leading end portion of the protrusion 304*b* decreases as shown in part (b) of FIG. 6. As the image forming operation of the image forming apparatus progresses further, when a leading end surface 304*d* (base material layer 304*a*) of the protrusion 304*b* is exposed, as shown in part (c) of FIG. 6, the base material layer 304*a* which has a larger friction coefficient than the sliding layer 304*c* directly contacts with the base layer 301*a* of the belt 301. As a result, a driving torque may be increased due to increased frictional force between the belt 301 and the sliding member 304 and an image defect due to uneven height of the protrusion 304*b* may be occurred. At this point, the fixing device 8 reaches an end of lifetime, so it is required that wear is suppressed so that the sliding layer 304*c* is not disappeared.

Therefore, it is desirable that a surface shape of the sliding layer 304*c* which is formed at the leading end portion of the protrusion 304*b* is a curved surface shape which has a curvature which decreases toward the contact portion between the sliding layer 304*c* and the base layer 301*a* of the belt 301 so that it is easy to enter the lubricant, based on widely known knowledge in a field of fluid lubrication. Further, it is desirable that the contact area between the sliding layer 304*c* and the belt 301 is small. However, when the contact area becomes somewhat smaller, wear is promoted as described above, and as a result, torque exceeds an allowable value due to an increase of the driving torque. Therefore, the surface shape of the sliding layer 304*c* which is possible to form the contact area which is neither too large nor too small is desirable. Thus, it is required that the sliding layer 304*c* has the surface shape of the curved surface with an optimum radius of curvature which satisfies such a shape.

[Curved Surface Shape of the Sliding Layer of the Protrusion]

The curved surface shape of the surface of the sliding layer 304*c* which is formed at the leading end portion of the protrusion 304*b* by using FIG. 7, parts (a) to (d). Part (a) of FIG. 7 is an enlarged sectional view of any one of the plurality of protrusions 304*b* on the sliding member 304 and is indicating so that the protrusion 304*b* is on top by showing upside down from FIG. 5, (a) and (b) and FIG. 6, (a) to (c). Incidentally, a sectional direction is in the X direction (feeding direction of the recording material) which is shown in FIG. 2, and is in a direction which is along a flow of the lubricant.

Here, the sliding layer 304*c* is formed by firing at a high temperature after spraying a coating agent such as fluorocarbon resin (PTFE, PFA, etc.) which is dispersed in water or an organic solvent onto a surface on a side of the base material layer 304*a* which slides on the belt 301, that is, a surface on which the protrusion 304*b* is formed. In the embodiment, viscosity of the coating agent during spraying (when it is liquid) is 10 Pa·sec or less at room temperature (25° C.). Since the sliding layer 304*c* has low viscosity of a few Pa·sec when it is sprayed at room temperature and the viscosity is further decreased during high temperature firing, the coating agent which serves as the sliding layer melts and flows moderately from a leading end surface 304*d* (head top portion) to a valley portion along the protrusion 304*b*, thereby the curved surface shape is formed.

As shown in part (b) of FIG. 7, when a width of the leading end surface 304*d* of the protrusion 304*b* is defined as a width Wbc, a radius of curvature of the curved surface shape of the surface of the sliding layer 304*c* varies depending on a size of the width Wbc. For example, as shown in part (c) of FIG. 7, in a case that the width Wbc is small, the radius of curvature of the surface of the sliding layer 304*c* is small, and as shown in part (b) of FIG. 7, in a case that the width Wbc is large, the radius of curvature is large.

An example of an actual measurement and calculation of the radius of curvature of the curved surface shape of the surface of the sliding layer 304*c* at the leading end portion of the protrusion 304*b* will be described as below. A height profile in a two-dimensional direction which is measured at a set magnification of 40× by using a VR-3200 three-dimensional shape coordinate measuring machine which is manufactured by Keyence is extracted. And, as shown in part (d) of FIG. 7, three points are defined as two points of intersections (r2, r3) between a vertex of the sliding layer 304*c*, the surface of the sliding layer 304*c* and a virtual line which is drawn horizontally from a vertex portion of the protrusion 304*b*, and an intersection (r1) between a virtual line which is perpendicular to a center of the line which connects these two points and the surface of the sliding layer 304*c*. By using the three points, it is possible to calculate the radius of curvature R of the surface of the sliding layer 304*c* at the leading end portion of the protrusion 304*b*. In the embodiment, the radius of curvature of the surface of the sliding layer 304*c* at the leading end portion of the protrusion 304*b* is defined by the method which is described above.

Further, in the embodiment, the shape of the surface of the sliding layer 304*c* which is formed at the leading end portion of the plurality of protrusions 304*b* is a curved surface with the radius of curvature R of 300 μm≤R≤850 μm, according to results of following study experiments. Incidentally, it is preferable that the radius of curvature R is 306 μm≤R≤821 μm, and it is more preferable that it is 350 μm≤R≤700 μm.

[Study Experiment]

Next, the study experiment which is conducted to confirm effectiveness of the embodiment. For the study experiment, a plurality of the sliding members (samples) from A through G, in which the radiuses of curvature R of the surface of the sliding layer 304*c* at the leading end portion of the protrusion 304*b* are varied by changing the shape of the protrusion 304*b*. The sliding members from A through G which are used in this study are prepared with the radiuses of curvature R of the surface of the sliding layer 304*c* at the leading end portion of the protrusion 304*b* of 162 μm, 306 μm, 505 μm, 681 μm, 821 μm, 985 μm and 1,101 μm, respectively.

And these sliding members from A through G are sequentially replaced in the fixing device 8, and a driving endurance test is conducted. The driving endurance test is conducted in a mode in which a state that the pressing roller 305 contacts the belt 301 and a state that the pressing roller 305 does not contact the belt 301 are repeated by turn. A target design time in this mode is 240 hours. In a case that the driving torque of the belt 301 exceeded a preset upper limit value within the target design time, the driving endurance test is terminated, and in a case that the driving torque does not exceed the upper limit value within the target design time, the driving endurance test is terminated after an elapse of the target design time. Incidentally, the upper limit value of the driving torque which is described above is set at 300 mNm, which may cause an image defect due to a slip and damage to a driving gear.

Next, the results of the study experiment will be described by using the table in FIG. 8. As shown in the table in FIG. 8, the driving torque of the sliding member A exceeds a threshold value within the target endurance design time. When the sliding member A is removed and checked, it is observed that many of the 304*c* sliding layers is disappeared. Further, the inner peripheral surface of the belt 301 is severely damaged, and since the sliding layer 304*c* is lost, it is confirmed that the base material layer 304*a* of the sliding member is exposed and the inner peripheral surface of the belt 301 is excessively slid.

Although the driving torque of the sliding member B during the target endurance design time does not exceed the threshold value, since the final driving torque value (at an end of the endurance test) is 290 mNm, the driving torque is increased to near the upper limit value. Similarly, when the sliding member B is removed and checked, there is no portions in which the sliding layer 304*c* is disappeared due to wear, however, the sliding layer 304*c* wears to approximately 3 μm whereas its initial thickness was approximately 20 μm. In some places streaky scars are found on the inner peripheral surface of the belt 301, however, these are not enough to be a problem.

Similarly, the sliding members C and D are also examined, however, both the driving torque at an initial stage and the driving torque at an end of the test are sufficiently low relative to the upper limit value, and no increase in torque is observed. The sliding layer 304*c* is also remained sufficiently, and no special damage is observed on the inner peripheral surface of the belt 301.

Approximately an hour after starting the test, the driving torque value of the sliding member E is increased to 286 mNm, and the test is terminated since it is determined that there is a risk of failure in a case of continuing the test at this rate. When the sliding member E is removed and checked, there is almost no wear on the sliding layer 304*c*, however, streaky scars are seen on the inner peripheral surface of the belt 301. It is assumed that this may be due to inhibiting an entry of the lubricant since the radius of curvature R of the surface of the sliding layer 304*c* is large and a contact area between the sliding layer 304*c* and the base layer 301*a* of the belt 301 is increased. Incidentally, the driving torque and the damage to the inner peripheral surface of the belt 301 for the sliding member E are more than sufficient to withstand practical use, compared to the sliding member A which is described above and the sliding members F and G which will be described below.

For sliding members F and G, the test is discontinued, because the driving torque value exceeds 300 mNm immediately after the start of the test.

FIG. 9 is a graph which summarizes the results of the experiments which are described above. The radius of curvature R of the surface of the sliding layer 304*c*, which is formed at the leading end portion of the protrusion 304*b* in which the driving torque value which is measured at an initial stage of the endurance test is 300 mNm, is approximately 850 μm between the sliding member E and the sliding member F. Further, the radius of curvature R of the surface of the sliding layer 304*c*, in which the driving torque value is 300 mNm or less at an initial stage of the endurance test and exceeds it at the end of the endurance test, is approximately 300 μm between the sliding member A and the sliding member B.

Therefore, the radius of curvature R of the surface of the sliding layer 304*c*, in which it is possible to suppress the initial driving torque and the increase in driving torque after long term use, is 300 μm≤R≤850 μm. Incidentally, according to results which are shown in FIG. 8, it is preferable that the radius of curvature R is 306 μm≤R≤821 μm. Further, it is more preferable that the radius of curvature R is 350

μm≤R≤700 μm, since the initial driving torque and the driving torque at the end of the endurance test are suppressed to approximately 250 mNm or less in FIG. 9.

[Another First Example of the Embodiment]

As shown in FIG. 10, a sliding member 304A may have a leading end surface **304*d*1 of a plurality of protrusions 304*b*1 as a curved surface. That is, the sliding member 304 may be configured to adjust the radius of curvature R of the surface of the sliding layer 304*c* by making the protrusion 304*b*1 itself a curved surface shape. In this case, a method for measuring and calculating the radius of curvature R will be described below. A height profile in a two-dimensional direction which is measured at a set magnification of 40× by using a VR-3200 three-dimensional shape coordinate measuring machine which is manufactured by Keyence is extracted. And, as shown in FIG. 11, three points are defined as two points of the intersections (r2, r3) between the virtual line which is drawn horizontally from the vertex portion of the protrusion 304*b* and the surface of the sliding layer 304*c*, and the intersection (r1) between the virtual line which is perpendicular to the center of the line which connects these two points and the surface of the sliding layer 304*c***, and the radius of curvature R is calculated by using the three points.

Incidentally, in the sliding member 304A according to the example, the radius of curvature R of the sliding layer **304*c* is within the range which is described above by changing a shape of the leading end surface 304*d*1 of the plurality of protrusions 304*b*1 such as changing a curvature of the curved surface. Further, the protrusion 304*b*1 is not limited to the shape which is shown in FIG. 10**, however, for example, it may be configured by combining surfaces with different curvatures, or it may be an asymmetrical shape.

[Another Second Example of the Embodiment]

As shown in FIG. 12, the base material layer **304*a* and the sliding layer 304*c* of a sliding member 304B may be molded from same material. In the example, PTFE (Poly Tetra Fluoro Ethylene) is used, however, mold releasing materials such as PFA may be used or the mold releasing materials which is mixed with PI, PEEK, LCP, etc. may be used. A mold is manufactured, fired, and formed in order to make a surface shape of the sliding layer 304*c* which covers the leading end portion of the protrusion 304*b*** which has the desired radius of curvature.

Incidentally, in the sliding member 304B according to the example, the radius of curvature R of the sliding layer **304*c* is also within the range which is described above by changing the shape of the leading end surface of the plurality of protrusions 304*b*** such as changing the curvature of the curved surface.

[Another Third Embodiment of the Embodiment]

Incidentally, in the embodiment which is described above, a configuration in which the sliding layer **304*c* is provided directly on the base material layer 304*a*, however, as shown in FIG. 13, an adhesive layer 304*e* may be provided between the base material layer 304*a* and the sliding layer 304*c*. That is, the sliding member 304 may also be configured to be provided with the adhesive layer 304*e* which adheres the base material layer 304*a* and the sliding layer 304*c* between the base material layer 304*a* which includes the plurality of protrusions 304*b* and the sliding layer 304*c*. By using the adhesive layer 304*e*, it is possible to show good adhesive strength between the base material layer 304*a* and the sliding layer 304*c* when the base material layer 304*a*** is made of a metallic material such as stainless steel, copper, or aluminum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028930 filed on Feb. 28, 2022, which is hereby incorporated by reference herein in its entirety.

What is claimed is:

1. A fixing device comprising:
- an endless belt configured to apply heat to a recording material;
- a rotatable pressing member contacting an outer circumferential surface of the belt;
- a pad member inside of the belt, configured to form a nip portion by nipping and feeding the belt between itself and the rotatable pressing member; and
- a sliding member held by the pad member and configured to slide on an inner circumferential surface of the belt in the nip portion,
- wherein the rotatable pressing member nips and feeds the recording material in the nip portion in cooperation with the belt and fixes a toner image on the recording material by applying heat and pressure,
- wherein the sliding member includes a base material layer on which a plurality of projections projecting toward the rotatable pressing member are formed on a side sliding with the belt and a sliding layer provided on an outer surface of the plurality of projections, and
- wherein a shape of a surface of the sliding layer is a curved surface and a radius of curvature R of the curved surface satisfies 300 μm≤R≤850 μm.

2. The fixing device according to claim 1, wherein the radius of curvature R satisfies 350 μm≤R≤700 μm.

3. The fixing device according to claim 1, wherein a lubricant having a viscosity of 300cSt to 1500cSt is applied to an inner circumference of the belt.

4. The fixing device according to claim 1, wherein the sliding layer is formed by baking after spray coating of a coating agent to a surface of a side of the base material layer which slides on the belt, and
- wherein a viscosity of the coating agent during spray is not more than 10 Pa·sec at a 25°.

5. The fixing device according to claim 1, wherein the base material layer is made of a metal, and
- wherein the sliding layer is made of a resin.

6. The fixing device according to claim 5, wherein the sliding layer is made of a fluororesin.

7. The fixing device according to claim 5, wherein a leading end of the plurality of projections of the base material layer is a plane.

8. The fixing device according to claim 1, wherein a load value applied to the pad member and the rotatable pressing is less than 900N.

9. The fixing device according to claim 1, wherein a fixing operation continues in a state in which the surface of the sliding layer slides on an inner circumference of the belt.

10. The fixing device according to claim 1, wherein an oil is applied to an inner circumference of the belt as a lubricant.

* * * * *